Oct. 22, 1963 A. W. SCRIBNER 3,107,787
METAL EXTRUSION
Filed Oct. 18, 1960

INVENTOR
Albert W. Scribner
BY
ATTORNEY

United States Patent Office 3,107,787
Patented Oct. 22, 1963

3,107,787
METAL EXTRUSION
Albert W. Scribner, 89 Grennan Road,
West Hartford 7, Conn.
Filed Oct. 18, 1960, Ser. No. 63,360
5 Claims. (Cl. 207—17)

This invention relates to a novel method and apparatus for more efficiently die expressing metal and the like, and more particularly relates to a method of and apparatus for extensively working the billet material in both transverse and longitudinal shear planes during an extrusion operation.

This application is a continuation-in-part of my copending application Serial No. 665,034, filed June 11, 1957, for Reduction of Metal, now abandoned.

One object of the invention is to provide a novel method and apparatus for die expressing metal whereby a substantial portion of the metal reduction is produced by a shearing action that occurs along substantially parallel slip planes.

Another object of the invention is to provide a novel method and apparatus for die expressing metal whereby the sectional profiles respectively taken in parallel planes located just before and after the extrusion section are substantially the same.

Another object of the invention is to provide a novel method and apparatus for die expressing metal whereby the work metal is extensively but efficiently kneaded in mutually perpendicular planes during the extrusion operation so that the physical properties of the extruded product are superior to those of the initial work metal.

Another object of the invention is to provide a novel method and apparatus for extruding metal whereby the work metal is forced through an angularly disposed die opening having a width that is substantially the same as that for the adjacent end of the container bore.

A further object of the invention is to provide a novel extrusion method and apparatus whereby an angularly disposed die opening is provided adjacent an inclined end of a container bore.

Other objects and many of the attendant advantages of this invention will be readily appreciated as the same becomes better understood by reference to the following detailed description when considered in connection with the accompanying drawings in which like reference numerals designate like parts throughout the several figures and wherein.

Unless otherwise indicated it will be assumed that the various parts shown and/or described are suitably mounted and supported in a well known manner.

Figure 1:
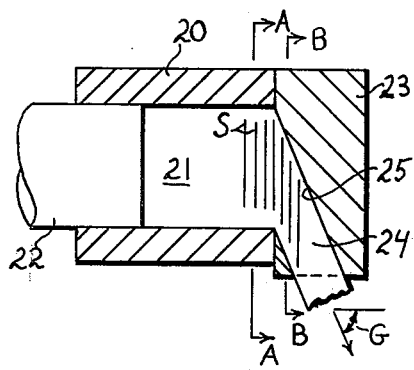
FIGS. 1 and 2 are axial sectional views respectively illustrating two extrusion presses which are constructed and arranged in accordance with the principles of the instant invention.

Referring to FIG. 1 there is shown an extrusion press comprising a container 20 having a cylindrical billet receiving bore 21 formed therethrough. A ram 22 is slidably mounted at one end of the container bore while a die block 23 is operatively mounted at the other end of said container bore. The die block 23 is formed with a die opening or orifice 24 whose axis is angularly disposed with respect to the axis of said container bore, said orifice being partially formed by an inclined die block end surface 25. The sectional profiles of the right end of the container bore 21 and the adjacent die opening 24 taken along parallel section planes A—A and B—B respectively are substantially the same, said section planes being substantially normal to the axis of bore 21. When a work billet has been operatively positioned and confined in the container and a compressive extrusion force applied thereto by ram 22 the successive transverse strata or layers S of the work material will be progressively relatively displaced along substantially vertical shear planes.

Figure 2:
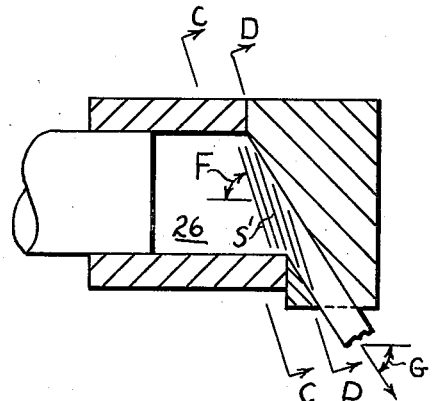

FIG. 2 shows an extrusion device which is similar to that of FIG. 1. Here the sectional profiles of the right end of the bore 26 and the adjacent die opening taken along parallel section lines C—C and D—D respectively are substantially the same, said section lines and the transverse elemental layers or strata S' of the work billet however are disposed at an acute angle F with respect to the axis of said bore 26.

Figure 3:
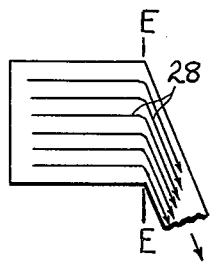
FIG. 3 is a diagrammatic view illustrating the laminar type flow of the work metal as the latter approaches and moves through the extrusion orifice.
Figure 5:
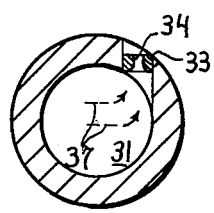
FIG. 5 is a cross sectional view taken along section line 5—5 of FIG. 4.

In operation the metal working action of the presses of FIGS. 1 and 2 will respectively correspond to that illustrated in FIGS. 5 and 10 of the above noted copending application. The extruded work leaves the die opening at an angle G with respect to the container bore axis, the width of the extruded work here being inherently substantially equal to the width of the work billet. FIG. 3 illustrates the lines of flow of the work metal as the latter is progressively die expressed by a press of the type shown in FIG. 1. Here the flow lines 28 remain substantially parallel before and after the change in the direction of metal flow at section E—E. This method of extrusion will not only produce a reduction in cross sectional area and an elongation in the extruded work material but will also insure an extensive transverse as well as longitudinal working of the metal during the die expressing operation and such will greatly improve the physical and metallurgical qualities of the extruded metal.

Figure 4:
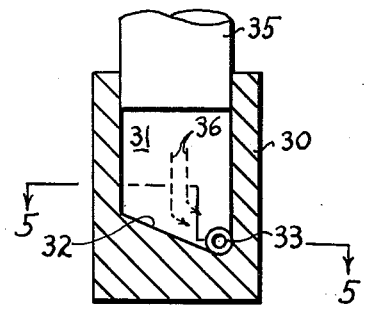
FIG. 4 is an axial sectional view of a modification of the apparatus of FIG. 1.

FIG. 4 illustrates a modification of the apparatus of FIG. 1. Here a container 30 is provided with a cylindrical bore 31 that is formed with an inclined end surface 32. An extrusion die 33 is mounted in the container side wall so that the die axis is substantially normal to a radial line from the container bore axis. The die opening 34 then is disposed in substantially tangential relation with respect to the bore 31. As the ram 35 forces the work metal through the die orifice the metal will change its direction of flow twice as illustrated by arrows 36 and 37 of FIGS. 3 and 4, respectively, and this action will insure a shear working of the metal in mutually perpendicular transverse planes as well as in longitudinal planes. This spiral type flow will further enhance the properties of the extruded material.

While several embodiments of the invention have been shown and described, it will be apparent to those skilled in the art that numerous variations and modifications may be made in the particular construction without departing from the underlying principles of the invention. It is therefore desired, by the following claims, to include within the scope of the invention all such variations and modifications whereby substantially the results of the invention may be obtained by the use of substantially the same or equivalent means.

I claim:

1. An extrusion press; comprising a container having a billet receiving bore formed therein, a ram slidably mounted at one end of said container bore, a die block mounted at the other end of said container bore and having an extrusion opening the axis of which is disposed at an angle with respect to the adjacent end of the axis of said container bore, the width of said extrusion opening being substantially the same as the width of the adjacent end of said container bore, and the sectional profiles of said container bore and extrusion opening respectively taken in parallel planes are substantially the same.

2. An extrusion press; comprising a container having a billet receiving bore formed therein, a ram slidably mounted at one end of said container bore, a die block mounted at the other end of said container bore and having an extrusion opening the axis of which is skewed with respect to the adjacent end of the axis of said container bore, the axis of said extrusion opening being in a plane that is disposed substantially perpendicular to a radial line from the axis of the adjacent end of said container bore.

3. Apparatus as defined by claim 2 wherein the die end of said container is inclined with respect to the bore axis, and wherein said die opening is disposed in substantially tangential relation with respect to said bore.

4. Apparatus as defined by claim 2 wherein the axis of the die opening is substantially normal to the plane defined by the container axis and said radial line.

5. Apparatus as defined by claim 2 wherein the die opening is tangentially disposed relative to the container bore.

References Cited in the file of this patent

UNITED STATES PATENTS

| | | |
|---|---|---|
| 2,021 | Hanson | Mar. 29, 1841 |
| 2,401,235 | Farr et al. | May 28, 1946 |
| 2,528,260 | Cademartori | Oct. 31, 1950 |
| 2,708,512 | Schlecht et al. | May 17, 1955 |
| 2,728,453 | Thweatt et al. | Dec. 27, 1955 |
| 2,750,034 | Gersman | June 12, 1956 |
| 2,738,064 | Kreidler | Mar. 13, 1956 |
| 2,894,623 | Walton | July 14, 1959 |
| 3,024,896 | Scribner | Mar. 13, 1962 |